United States Patent
Geaghan (10) Patent No.: US 9,710,074 B2
(45) Date of Patent: *Jul. 18, 2017

(54) DIGITIZER USING POSITION-UNIQUE OPTICAL SIGNALS

(71) Applicant: 3M INNOVATIVE PROPERTIES COMPANY, St. Paul, MN (US)

(72) Inventor: Bernard O. Geaghan, Salem, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/689,533

(22) Filed: Apr. 17, 2015

(65) Prior Publication Data

US 2015/0220167 A1    Aug. 6, 2015

Related U.S. Application Data

(63) Continuation of application No. 13/545,019, filed on Jul. 10, 2012, now Pat. No. 9,035,911.

(60) Provisional application No. 61/507,669, filed on Jul. 14, 2011.

(51) Int. Cl.
| | | |
|---|---|---|
| G06F 3/042 | (2006.01) | |
| G06F 3/0354 | (2013.01) | |
| G06F 1/32 | (2006.01) | |
| G06F 3/038 | (2013.01) | |

(52) U.S. Cl.
CPC ........... *G06F 3/03542* (2013.01); *G06F 1/32* (2013.01); *G06F 3/0386* (2013.01); *G06F 3/042* (2013.01); *G06F 3/0421* (2013.01)

(58) Field of Classification Search
CPC ........ G06F 3/0412; G06F 2203/04109; G06F 3/0421; G06F 3/086; G02B 26/02
See application file for complete search history.

(56) References Cited

U.S. PATENT DOCUMENTS

| | | |
|---|---|---|
| 4,190,831 A | 2/1980 | Stahle |
| 4,367,465 A | 1/1983 | Mati |
| 6,100,538 A | 8/2000 | Ogawa |
| 6,377,249 B1 | 4/2002 | Mumford |
| 6,437,314 B1 | 8/2002 | Usuda et al. |
| 6,441,362 B1 | 8/2002 | Ogawa |
| 6,498,602 B1 | 12/2002 | Ogawa |
| 7,468,721 B2 | 12/2008 | Nakano |
| 7,532,800 B2 | 5/2009 | Iimura |
| 7,626,575 B2 | 12/2009 | Cho et al. |
| 7,646,377 B2 | 1/2010 | Geaghan |
| 7,699,516 B1 | 4/2010 | Lee |
| 8,436,837 B2 | 5/2013 | Myers |
| 8,842,076 B2 | 9/2014 | Doray et al. |
| 2005/0057487 A1 | 3/2005 | Takata et al. |

(Continued)

FOREIGN PATENT DOCUMENTS

EP    1 403 696    3/2004

OTHER PUBLICATIONS

International Search Report, Form PCT/ISA/210, PCT/US2012/045999, International Filing Date: Jul. 10, 2012, 4 pages.

*Primary Examiner* — Ricardo L Osorio
(74) *Attorney, Agent, or Firm* — Robert S. Moshrefzadeh (57) ABSTRACT

The present invention provides systems and methods of using a stylus that houses optics and a detector capable of receiving optical signals that are combined with a displayed image. Stylus position determination is made by analyzing received optical signals.

3 Claims, 7 Drawing Sheets

(56) References Cited

U.S. PATENT DOCUMENTS

| | | |
|---|---|---|
| 2005/0184964 A1 | 8/2005 | Liao |
| 2007/0052692 A1 | 3/2007 | Gruhlke et al. |
| 2008/0100593 A1 | 5/2008 | Skillman et al. |
| 2009/0141001 A1 | 6/2009 | Kuroda |
| 2009/0262052 A1 | 10/2009 | Yang |
| 2010/0014027 A1 | 1/2010 | Li |
| 2010/0156807 A1 | 6/2010 | Stallings et al. |
| 2011/0122091 A1 | 5/2011 | King et al. |
| 2011/0157097 A1 | 6/2011 | Hamada et al. |
| 2011/0205189 A1 | 8/2011 | Newton |
| 2012/0026139 A1 | 2/2012 | Chou |
| 2012/0200532 A1 | 8/2012 | Powell et al. |
| 2012/0206415 A1 | 8/2012 | Miyazaki et al. |
| 2013/0016527 A1 | 1/2013 | Geahgan |
| 2013/0027355 A1 | 1/2013 | Hata et al. |
| 2013/0153787 A1 | 6/2013 | Geaghan et al. |

DIGITIZER USING POSITION-UNIQUE OPTICAL SIGNALS

BACKGROUND

Pointing devices of various types are used in almost every computer application today. Some of the pointing devices that have been developed and popularized include:
(1) a mouse;
(2) a trackball;
(3) a transparent-touch screen that overlays the display including resistive and capacitive types;
(4) pressure, capacitive, resistive, or thermal sensitive tablet separate from the display;
(5) beam-breaking detectors surrounding the display;
(6) a light pen based on detection of the raster scan timing of the phosphor refresh beam;
(7) a stylus that incorporates pressure transducers; and
(8) a pen using ultrasonic, stereo tactic or radio frequency triangulation methods.

The various devices developed to position a pointer on a computer screen operate in conjunction with the application software on the computer using an appropriate software driver. Most such drivers try to emulate the conventional X/Y roller mouse. Typically, only positional information is fed to the application software that controls the position of the pointer on the screen.

Pens may offer increased fidelity of user interaction with computer systems. However, depending on implementation, the resolution of pen position determination may be limited to that of the touch-sensitive sensor. Often, touch screens and tablets have a touch resolution that is coarser than the screen resolution of the computer for which they are acting as an input device.

SUMMARY

A digitizer system wherein a backlight used in an electronic display is configured to emit signals that can be sensed by a stylus. The stylus can determine, from the emitted signals, its location proximate the electronic display. The emitted signals may, in one embodiment, comprise human-visible light that is modulated at a frequency that is undetectable, or at least minimally noticeable, by a human user. In one embodiment, the stylus may determine its own position and report, via radio, associated coordinates back to a host computer, which may then update information on the display based on the coordinate information. A plurality of styli may be used in conjunction with the system so described, and the system may scale with relative ease to accommodate additional styli.

In one embodiment, a digitizer system is described, comprising a display device having a display area comprising a plurality of pixels; a backlight coupled to the display device; an optical stylus comprising an optical sensor coupled to a stylus body; an optical stylus processor communicatively coupled to the optical sensor; wherein the backlight is configured to emit at least a first and a second optical positional signal at a first and a second position; and wherein the optical stylus receives the optical positional signals, and the optical stylus processor generates location-related positional signals based on the received optical positional signals.

In another embodiment, a display system is described, comprising a display device having a display area comprising a plurality of pixels; a backlight coupled to the display device; an optical stylus comprising an optical sensor coupled to a stylus body; an optical stylus processor communicatively coupled to the optical sensor; wherein the backlight is configured to emit at least a first and a second optical positional signal at a first and a second position; and wherein the optical stylus receives the optical positional signals, and the optical stylus processor generates location-related positional signals based on the received optical positional signals.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

DETAILED DESCRIPTION

Movement of an optical stylus relative to a display may be measured by sensing position-unique optical signals provided, for example, by a backlight associated with the display. For example, light-emitting elements of an liquid crystal display (LCD)—type display device may be configured to emit position-related signals of light, possibly in a time-varying (modulated) manner, from different positions of the display, such that the combination of two (or more) such position signals at any given point on the display may be sensed by a stylus and used to determine the position of the stylus relative to, or on, the display device.

Figure 1A:
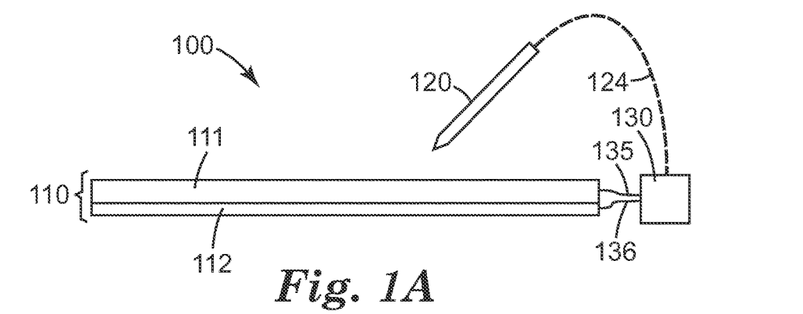
FIG. 1A is a schematic of an LCD based digitizer system.

FIG. 1A is a schematic of a digitizer system of embodiment A. Display 110 is an electronically addressable light shuttering display, such as an LCD. In LCD embodiments, display 110 includes a backlight 112, which provides human visible light through LCD panel 111. Backlight 112 includes at least two, and possible more, emitters which emit modulated light signals into components of display 110. The positional-modulated emitters may also emit visible light through the LCD, or they may emit non-visible light. The positional modulation of emitters, and the associated modulation of light signals, minimally affect the visible image being displayed by the electronically addressable display.

Optical stylus 120 includes an optical sensor coupled to a stylus body. The optical sensor receives the modulated light signals, which are processed by an optical stylus processor that may also be included within optical stylus 120, to determine the position of the optical sensor upon display 110. Communications link 124 communicatively couples stylus 120 to computing device 130, which may be a notebook or tablet computer, which is in turn communicatively coupled to display 110. Communications link 124 may comprise several conductors, or a radio link such as that implementing the wireless communications protocol referred to as Bluetooth™ Optical stylus processor includes electronics necessary to provide electrical signals indicative of the sensed signals computing device 130. Communications link 135 communicatively couples display device 110 with computing device 130. This coupling may be by a plurality of conductors or may be by radio. Communications link 136 communicatively couples backlight 112 with computing device 130 for the purpose of controlling backlight emitters. While computing device 130 is shown separate from display device 110, other integral combinations are possible, where both the display device and the computer are within the same chassis (as would be the case, for example, with tablet-type computers, all-in-ones, and laptops).

Figure 1B:
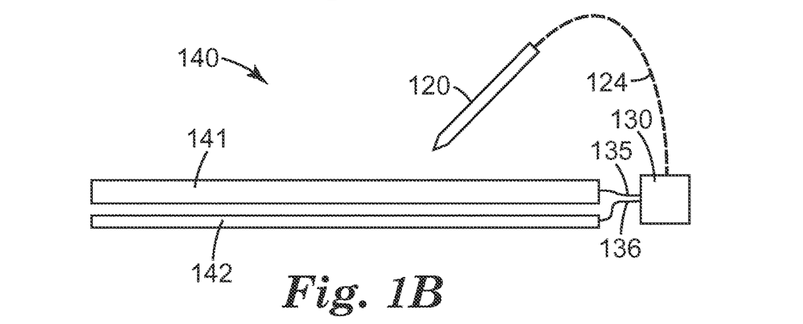
FIG. 1B is a schematic of an emissive display based digitizer system.

FIG. 1B is a schematic of a digitizer system 140 of embodiment B. Emissive display 141 is an electronically addressable visible light emitting display that is at least partially transparent or translucent at some wavelengths of light, for example infra-red. Examples of this display type include plasma displays and transparent organic light emitting diode (OLED) displays. Backlight 142, provides non-visible light through emissive display panel 141. Backlight 142 includes at least two, and possible more, emitters, which emit modulated light signals through display 141. The emitters, and the associated modulation of light signals, are preferably non-visible so they minimally affect the visible image being displayed by emissive display 141.

Figure 1C:
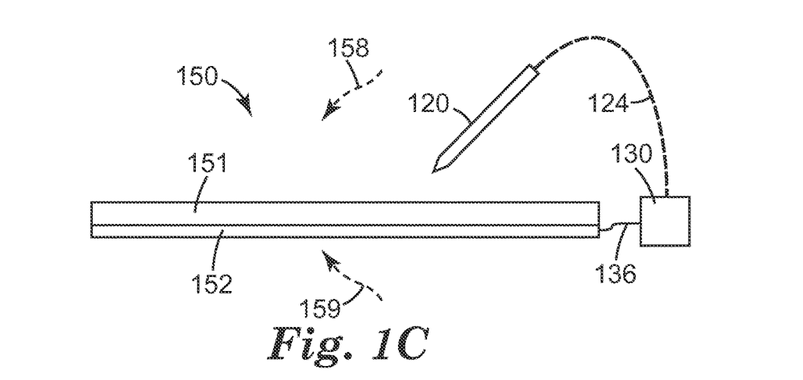
FIG. 1C is a schematic of a projection display based digitizer system.

FIG. 1C is a schematic of a digitizer system 150 of embodiment C. Display surface 151 is a light diffusing surface that is transparent or translucent at some non-visible wavelengths of light, and may be translucent at visible wavelengths of light. Examples of this display type include rear projection displays and front projection displays. In a front projection embodiment, visible light 158 is reflected from display surface 151. In a rear projection embodiment, visible light 159 is passes through backlight 152 and is diffused by display surface 151. Backlight 152 provides position-unique non-visible light (e.g. IR) through display surface 151. Backlight 152 includes at least two, and possible more, emitters, which emit modulated light signals through display surface 151. The emitters, and the associated modulation of light signals, minimally affect the visible image being displayed on the display surface. Backlight 152 is depicted with a flat cross section, though back lighting may also be projected onto surface 151 from a distance.

Figure 2:
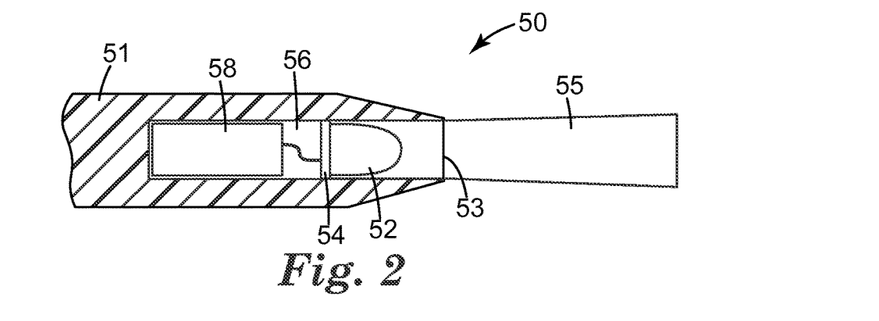
FIG. 2 is a schematic of a cross-section of an optical stylus.

FIG. 2 depicts a cross sectional view of an optical stylus 50 that can be used in the present invention. Lens 52 focuses light 55 from a display through aperture 53 onto signal detector 54, which is preferably a photodiode, phototransistor, or may be a charge coupled device (CCD) array, for example (these sensing components referred to collectively as an optical sensor).

Stylus signal detector 54 is communicatively coupled to optical signal processor 58. Optical signal processor receives signals from optical detector 54 through interconnection 56. In embodiments where detector 54 is a photodiode or phototransistor, processor 58 measures a signal indicating the intensity of display light 55. In embodiments where detector 54 is a 2D image detector such as a CCD, processor 58 measures a two dimensional map of intensities of display light 55.

In some embodiments, stylus 50 may incorporate a photodiode or phototransistor and also a CCD. For example, a photodiode may detect position-modulated IR light while a CCD views the visible pixels of the display.

The stylus 50 can have a long focal length so it remains focused on a display surface over ranges including when the stylus is contacting the front surface up to when the stylus is several meters from the display surface, for example. Stylus body 51 supports signal detector 54, lens 52, and processor 58. Stylus 50 may include optional components such as a tip switch or barrel switch, not shown.

Figure 3:
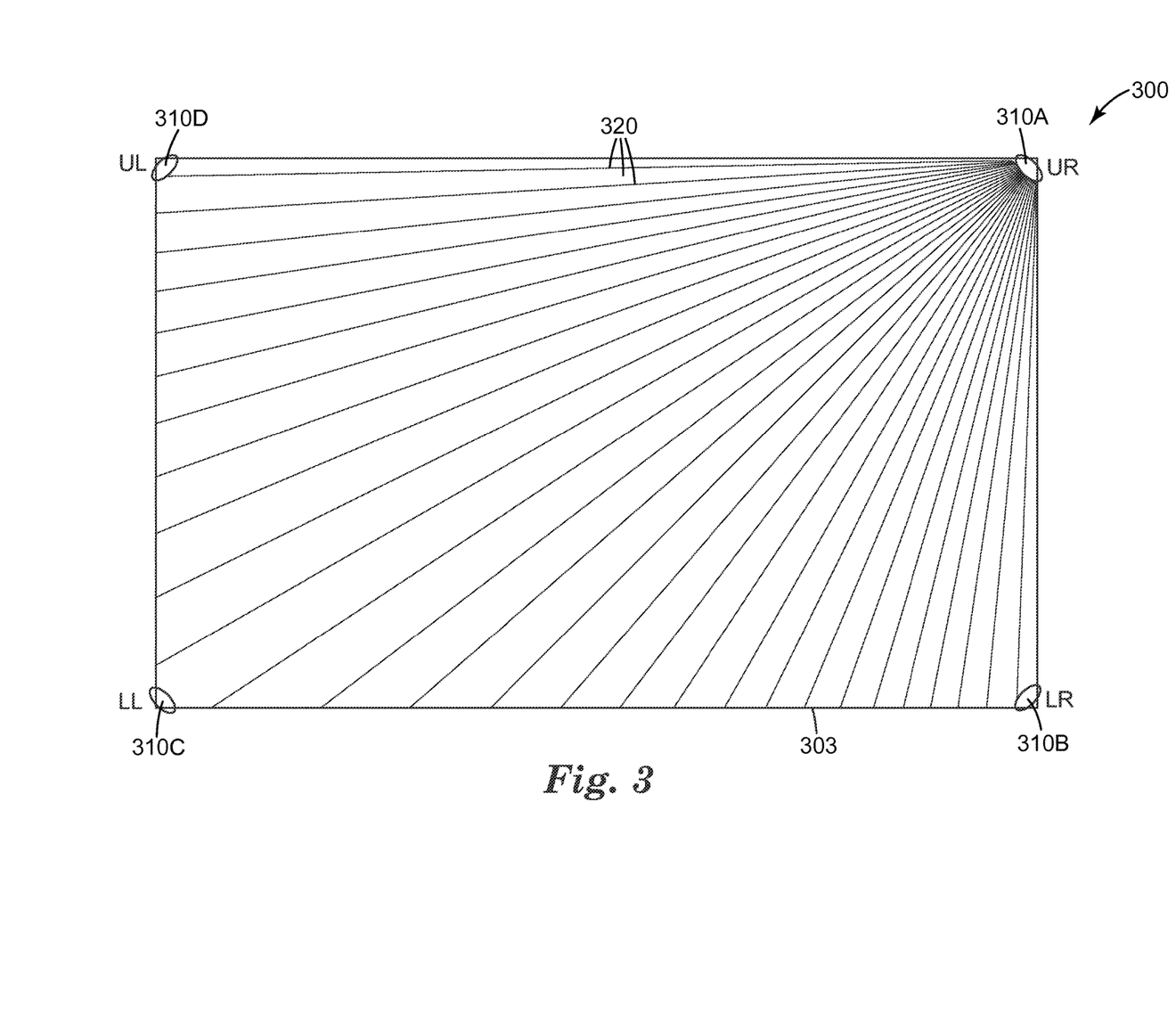
FIG. 3 is a simplified drawing of a backlight employing position-unique optical signals.

FIG. 3 is a drawing of a backlight 300 having light guide 303 and four optical signal emitters, positioned proximate to each corner of the light guide. Light guide 303 is a component commonly used in LCDs. It typically comprises one or more plates of transparent or translucent material. Typical light guides are described in US Patent Application No. 20100014027 and U.S. Pat. Nos. 7,532,800 and 7,699,516. A light guide may further include a light reflecting rear surface, and light directing films. Examples of light directing films include brightness enhancement films sold by 3M Corporation, St. Paul, Minn., under the trade names Vikuiti BEF I, BEF II, and BEF III. Backlight 300 would be positioned behind a display, in one embodiment. Positioning the light emitters around the perimeter of the display is referred to as edge lighting. Individual positional emitters provide optical signals that may be modulated with various pulse sequences, creating light signals that may be resolved to define unique positions on the display. The backlight shown in FIG. 3 has four emitters 310A-310D that provide optical positional signals, positioned at each of the corners. In some embodiments, emitters may additionally provide the visible light for the display, in displays that require backlighting, such as an LCD display. In other embodiments, positional emitters may be combines with additional lighting elements included in the edge lighting that are not providing optical positional signals. Additionally, while four emitters are shown in FIG. 3, other embodiments having for example only two emitters are possible.

For ease of representation, only representations of signals emitted from upper right ("UR") emitter 310A are shown in FIG. 3. Emitter 310A, in this embodiment, comprises an LED, providing light using light signals modulated at a frequency specific to emitter 310A. Other emitters 310B, 310C, and 310D, corresponding to locations Lower Right (LR), Lower Left (LL) and Upper Left (UL) would function similarly, but with different modulation waveforms or phase from one another. Light guide 303 provides distribution of the light signals from emitters 310A-310D across the area of light guide 303, and out of light guide 303 in a direction toward the user. Emitters, if integral to the backlight scheme of, for example, an LCD display, are typically located behind the display (from the perspective of a user who is located in front of the display), to thusly provide light through the individual pixels of said display. However, other configurations are possible. For example, in embodiments B and C above where the emitters do not additionally provide for backlighting, a separate substrate receiving signals provided by the emitters could be located on top (i.e., user-side) of the display, as a digitizer overlay component.

Optical positional signals 320 are represented emanating from emitter 310A. Signals emanating from other emitters may have different wavelengths or they may (and would typically) be of the same wavelength (color) light, but they may have unique modulation wave shape.

Figure 4:
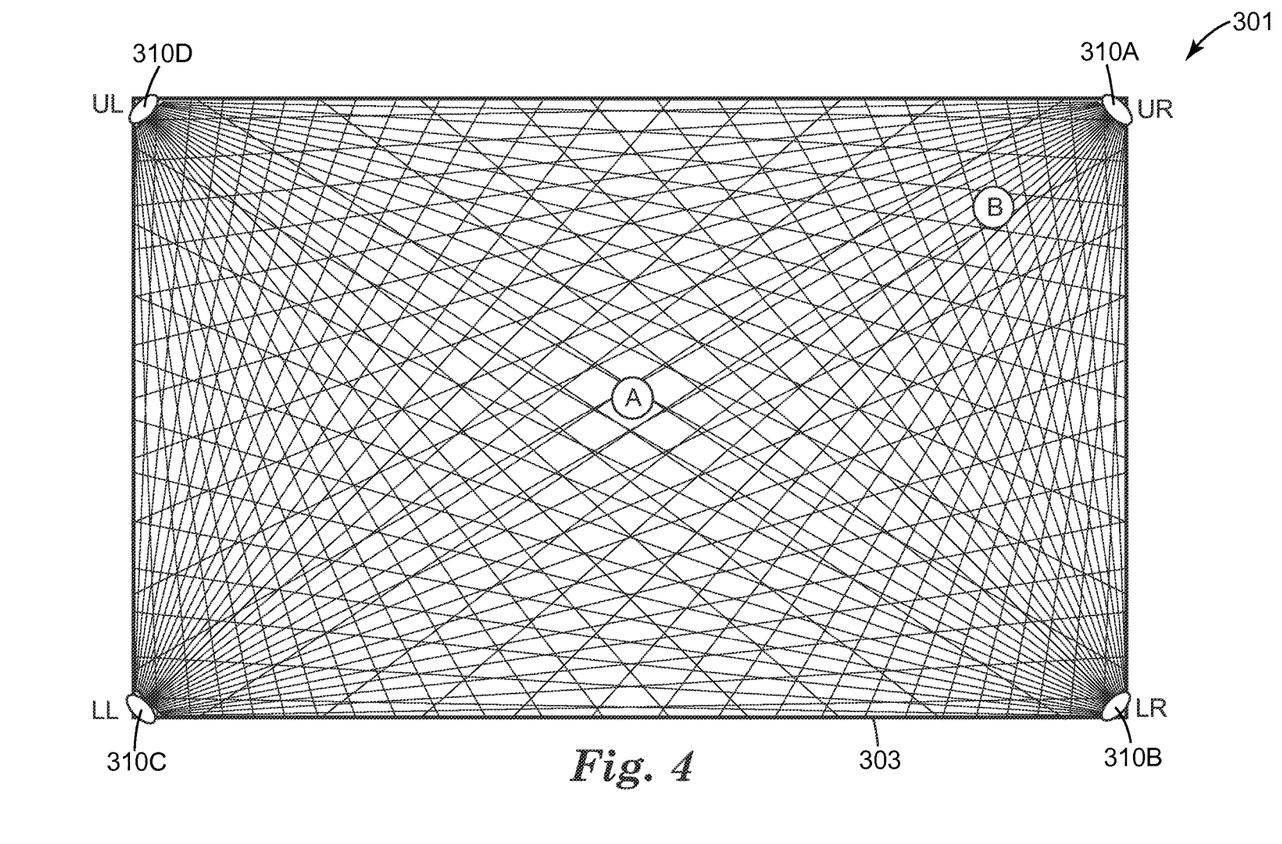
FIG. 4 is a simplified drawing of a backlight employing position-unique optical signals.

FIG. 4 is a drawing of backlight 301 having four optical signal emitters, positioned proximate to each corner of a rectangular display. It is similar to backlight 300 (FIG. 3), but additionally includes representation of optical positional signals associated with each of the emitters 310A-310D. FIG. 4 shows point A and point B, which are referred to in relation to subsequent figures.

Figure 5A:
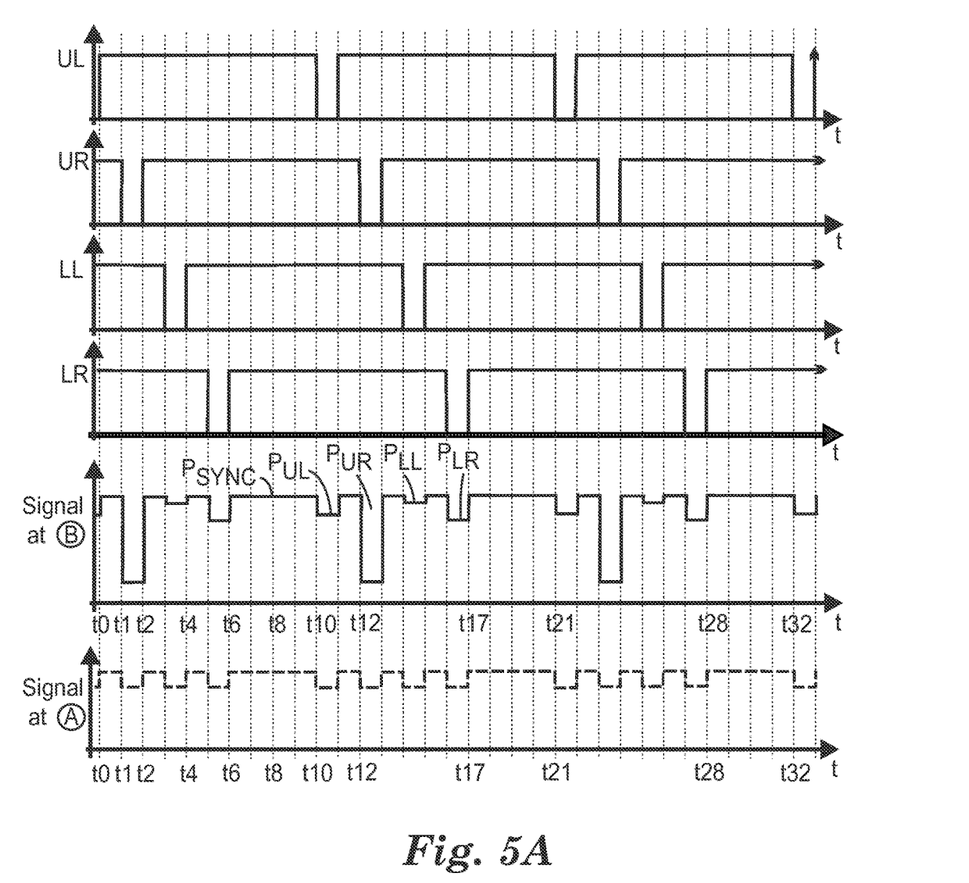
FIG. 5A is a time-axis chart showing representations of position-unique optical signals at various points on a display.

FIG. 5a is a graph showing light signals provided by emitters 310A-310D. Emitter UL (310D) is shown having a first waveform modulation; emitter UR (310A) is shown having a second waveform modulation; emitter LL (310C) is shown having a third waveform modulation; and emitter LR (310B) is shown having a fourth waveform modulation. All four emitters are on for four clock periods during synchronization period between t6 and t10. This provides a reference level for measuring proportions of light, and it provides a synchronizing signal that an untethered stylus can use as a time reference to determine when each light source is emitting. A representation of the summation of the four waveforms at various times is shown at the bottom of the graph, in one case associated with point A, and in another case associated with point B. An optical sensor (as in an optical stylus) would detect the sum of the signals emitted from the four emitters in proportions corresponding to the location of the optical sensor on the display. For example, an optical sensor positioned at point A (referring to FIG. 4) would detect equal amounts of light from each emitter. But a sensor positioned at point B would detect more light from source UR, followed by LR, UL, and LL. This phenomenon means a ratiometric approach may be used to determine the position of the optical sensor based on the relative magnitudes of the received signal, which changes as a function of how near they are to particular emitters.

For example with reference to FIG. 5a, signal B (corresponding to light measured at point B) is constant and maximum during the sync period from t6 to t10, then each of the four emitters UL, UR, LL, then LR is pulsed off in sequence between time t10 and time t17. As each emitter is pulsed off, there is a corresponding reduction in light received at point B. The changes in light are indicated by the magnitudes of pulses $P_{UL}$, $P_{UR}$, $P_{LL}$, and $P_{LR}$ in FIG. 5.

In each case, the pulse magnitude (deviation from the $P_{SYNC}$ level) is proportional to the relative contribution of light from each emitter, which is inversely proportional to the relative distance from each emitter.

Signal A (corresponding to light measured at point A) shows four pulses between t10 and t17, and all pulses are equal in magnitude. This indicates equal light received from the four emitters, which indicates that point A is equally distant from each of the emitters UL, UR, LL, then LR.

White LEDs may be used as emitters 310A-310D. Given the modulation shown in FIG. 5a, the LEDs have a 91% duty cycle so they contribute to the user-visible light emitted through, for example, an LCD, as well as providing optical positional signals used to determine the position of a stylus proximate the display. Infra-red (IR) LEDs may also or instead be used as emitters 310A-310D, which may be preferable for Embodiments A, B, and C. IR emitters used with Embodiment A may, in some embodiments, have a wavelength greater than 900 nM. Longer wavelength light penetrates LCD display pixels in the "on" state or the "off" state, so position signals may be measured relatively independent of the image displayed on the LCD. For example, LEDs that emit 950 nM IR are readily available.

Figure 5B:
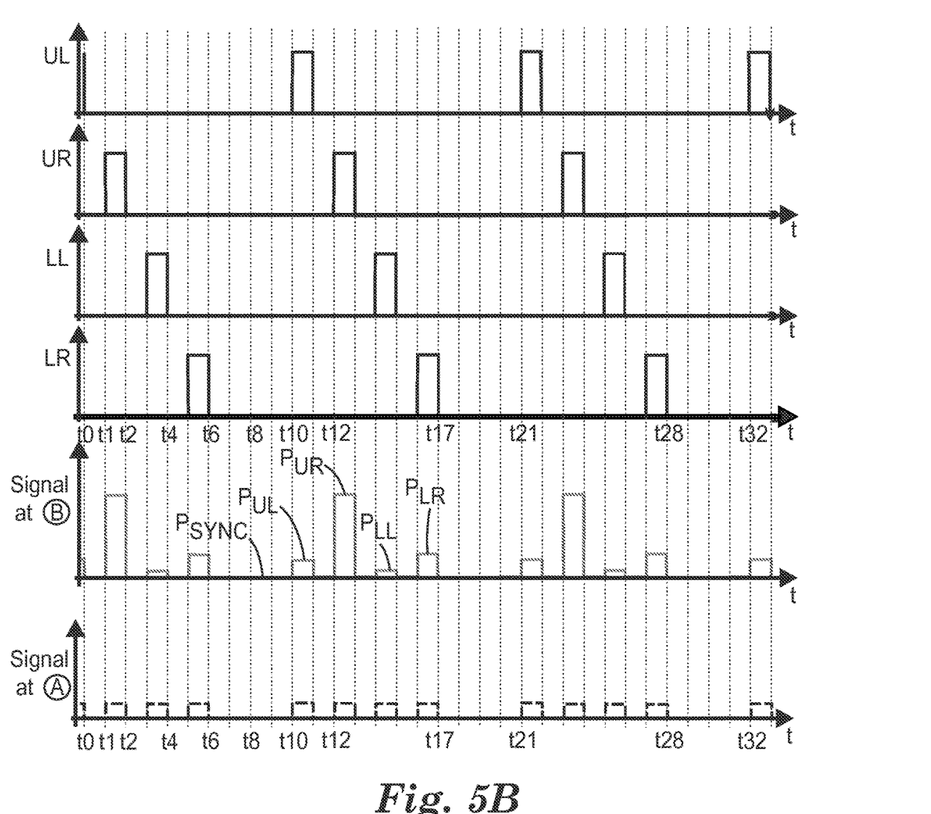
FIG. 5B is another time-axis chart showing representations of position-unique optical signals at various points on a display.

In embodiments using non-visible light emitting LEDs to generate position-unique signals, the duty cycle of the LED would preferably be reduced to save power, because such IR LEDs do not contribute to user-visible light emitted from the display. FIG. 5b shows a graph illustrating representative signals from such an embodiment. FIG. 5b is similar to 5a except the duty cycle of emitters UL, UR, LL, and LR reversed to 10% or less, rather than 91%.

In addition to locating a stylus relative to the surface of a single display, variations in pulse codes of FIG. 5A may be used to discriminate one display from another. For example, in a system with two or more displays, the stylus may detect which display is within its field of view, and communication from the stylus to its host computer system includes a display ID and corresponding multi-display coordinates. Other functions may include limiting a stylus to operate with one display but not with another.

Pulse codes of multiple displays may be made unique from one another in a variety of ways. For example, one display backlight may use IR pulses as shown in FIG. 5A while another display's backlight emits the same waveform, but at a different fundamental frequency, (the time period of a cycle from t6 to t17 is different). Another display may be differentiated by changing only the time period of the sync pulse $P_{SYNC}$ (from t6 to t10). Another display may be differentiated by changing the shape of pulses $P_{UL}$, $P_{UR}$, $P_{LL}$, and $P_{LR}$, for example each of pulses $P_{UL}$, $P_{UR}$, $P_{LL}$, and $P_{LR}$, may comprise two pulses rather than one, as is shown in the UL waveform of FIG. 6, or three pulses rather than one, as is shown in the LL waveform of FIG. 6. Additional waveform variations may be used separately or in combination to generate display-unique light signals.

Figure 6:
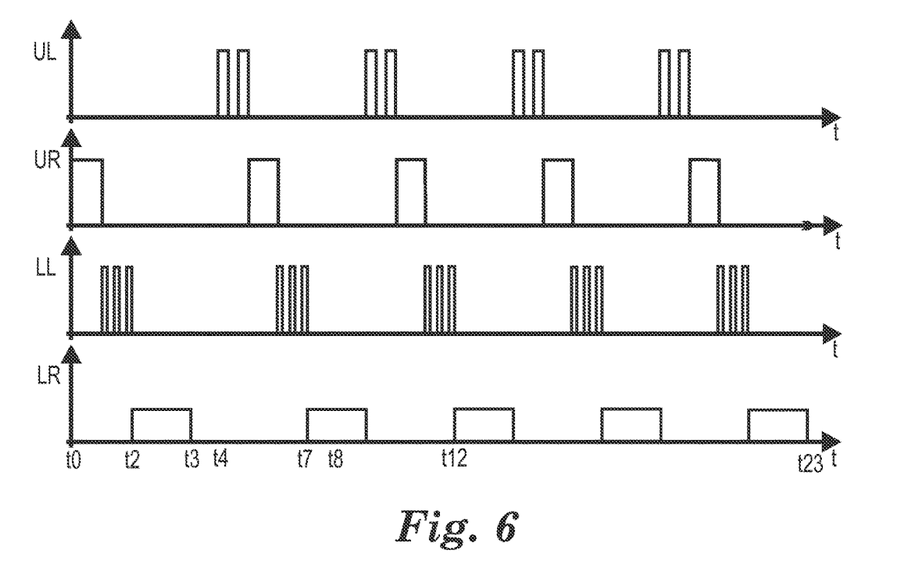
FIG. 6 is another time-axis chart showing representation of position-unique optical signals at various points on a display.

FIG. 6 shows a graph illustrating representative signals from another alternative embodiment. Rather than equal shaped, equally spaced emitter pulses with different phases, the pulses shown in FIG. 6 have various shapes, which help distinguish which emitter is contributing each portion of a signal received by an optical sensor.

It should be realized that the optical positional signals represented as waveforms in FIGS. 5A and 5B and 6 may be used in various combinations and any of the signals may be used with any wavelength light sources. Also, other modulation methods may be used, including amplitude modulation, frequency or phase modulation, variations of pulse coding, or sine waves with fixed frequency and amplitude or varying frequency and/or amplitude, and variations in wavelength of light emitted from different emitters. Modulated signals provided by emitters are preferably imperceptible or minimally perceptible to the human eye, due to the frequencies of modulation or to the wavelength of light that is modulated.

Figure 7:
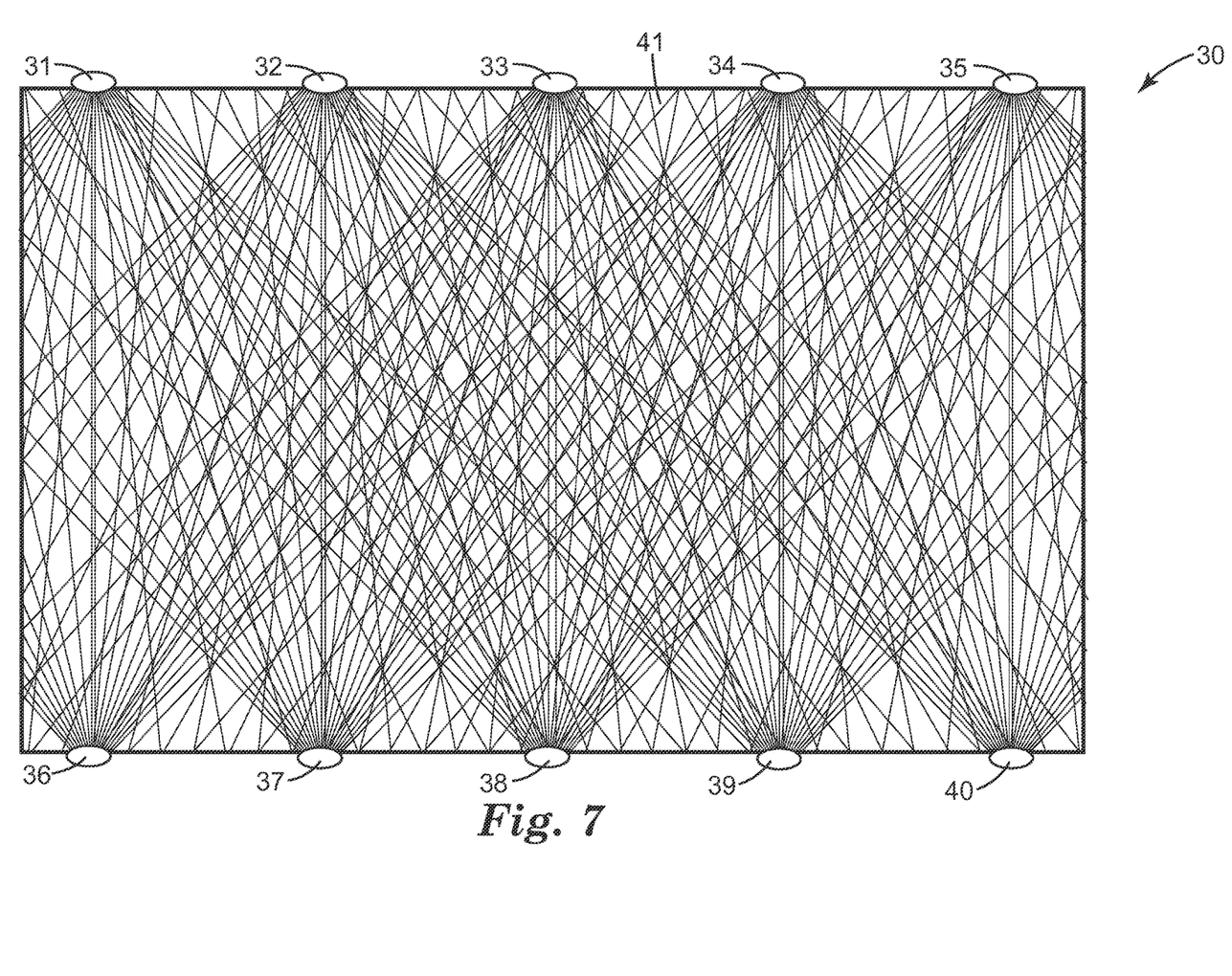
FIG. 7 is a simplified drawing of a backlight employing position-unique optical signals; and, FIG. 8 is a simplified drawing of a full-array backlight employing position-unique optical signals.

FIG. 7 is a drawing of backlight 30 including ten optical signal emitters, positioned along the top and bottom edge of light guide 41. This is a simplified representation of an LCD backlight: in practice LCD backlights may have many more such emitters. This basic layout, however, is typical of backlights using LED edge lighting. Rays representing light from emitters are shown for illustration purposes. Optical signal emitters 31-40 may be used to locate a stylus if light from at least some of the emitters is modulated differently than others. For example, emitters 31-40 may all emit the same color and average brightness in order to perform their respective backlighting function, but additionally they may be modulated with signals that result in optical positional signals that provide for position-unique signals that may be sensed at any position on the display. In one embodiment, each of the emitters 31-40 may modulate its respective optical positional signals uniquely. Alternatively, some of the emitters may modulate the same as others, provided that the sum of signals at every location on the surface of backlight 30 comprises a unique combination from the ten emitters 31-40. Further emitters 31 and 40 overlap minimally so they may emit identically modulated light. Emitters 35 and 36 may also emit identically modulated light because their optical positional signals may be combined with optical positional signals from other emitters such that the total emitted light at any given point on backlight 30 will be unique.

Figure 8:
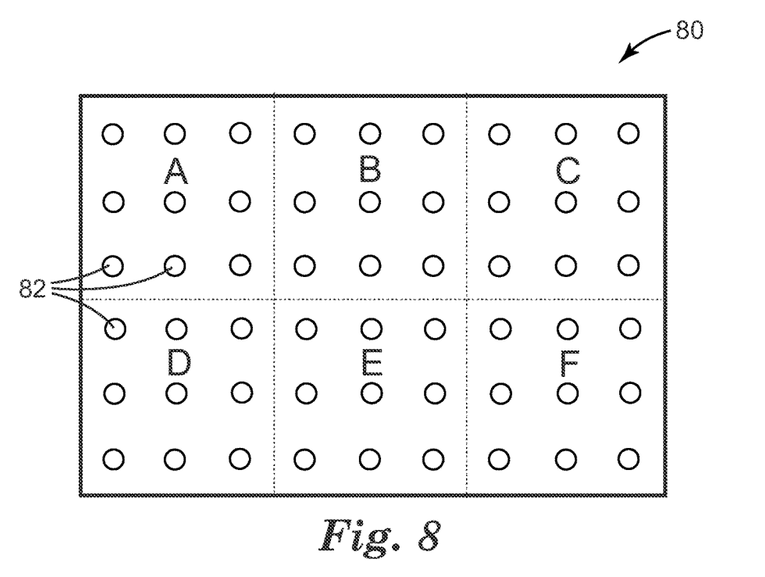

FIG. 8 shows full array backlight 80 similar to those used with some LCD displays. Backlight 80 is divided into six areas, A, B, C, D, E, and F. Emitters 82 each provide unique modulation of the light they provide, similar to other embodiments described herein.

Rather than white light LEDs, a further embodiment uses LED lasers as an edge light. The laser beam may be scanned across the light guide of an LCD display, refracting at grid lines in the light guide so its light emits through the visible display at predetermined places as the laser beam is scanned. The refracted portion of the laser beam may be detected by the optical sensor.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A display system comprising:
   a display device configured to display an image in a display area;
   a light guide positioned proximate to the display device;
   at least a first and a second light sources emitting at least a first and a second optical signal into the light guide;
   wherein the light guide is configured to mix the first and second optical signals with the display image such that positions on the display area are associated with a position-unique combination of the first and second optical signals.

2. A display system of claim 1, wherein the optical signals comprise infra-red light.

3. A display system of claim 1, wherein the optical signals comprise infra-red light with wavelengths greater than 900 nanometers.

* * * * *